(12) United States Patent
Diller

(10) Patent No.: US 6,857,344 B1
(45) Date of Patent: Feb. 22, 2005

(54) GROOVING TOOL HAVING COOLANT SUPPLY

(75) Inventor: Charles E. Diller, Springfield, OH (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 10/792,424

(22) Filed: Mar. 3, 2004

(51) Int. Cl.$^7$ .............................................. B23B 41/00
(52) U.S. Cl. ............................ 82/1.2; 82/173; 408/57
(58) Field of Search .......................... 82/1.2, 902, 173; 408/57, 153, 158

(56) References Cited

U.S. PATENT DOCUMENTS

| | | | | |
|---|---|---|---|---|
| 3,907,453 A | * | 9/1975 | Bennett | 408/199 |
| 4,579,488 A | * | 4/1986 | Griffin | 409/136 |
| 5,567,093 A | * | 10/1996 | Richmond | 409/136 |
| 6,796,207 B1 | * | 9/2004 | Long et al. | 82/158 |

OTHER PUBLICATIONS

Parts Manual entitled "Airetool—GT Series Grooving/Serrating Tool." Cooper Tools; Nov. 18, 2003; 8 pages.

* cited by examiner

Primary Examiner—Willmon Fridie, Jr.
(74) Attorney, Agent, or Firm—Coats & Bennett, P.L.L.C.

(57) ABSTRACT

A grooving tool includes a spindle rotatable about a longitudinal axis thereof and having at least one coolant inlet port, a ramp portion, and a fluid flow path to the ramp portion; a tool bit moveably coupled to the ramped portion, the tool bit comprising one or more teeth and one or more coolant channels to supply coolant proximate the one or more teeth, the one or more coolant channels operatively connected to the fluid flow path; wherein movement of the tool bit along the ramp portion toward the inlet port causes the one or more teeth to be displaced outward from the longitudinal axis. The fluid flow path may include a longitudinal passage in the spindle disposed generally along the longitudinal axis. The coolant channels may be angled with respect to the teeth and dispense coolant supplied via the fluid flow path toward the teeth.

34 Claims, 4 Drawing Sheets

GROOVING TOOL HAVING COOLANT SUPPLY

FIELD OF THE INVENTION

The present invention is directed generally the field of powered tools for forming one or more grooves on interior cylindrical surfaces, such as those found in pipes, tubes, or tube plates, and more particularly to such a tool with improved coolant supply.

BACKGROUND OF THE INVENTION

Pressure, reaction, and heat exchange vessels typically have a number of pipes leading into or out of the vessel. These pipes are typically joined to a so-called tube plate on the vessel. The tube plate is typically a relatively thick plate with a number of holes drilled therein at desired spacings. The holes act as female pipe mounting ports such that the relevant pipe may be fitted therein. In order to ensure a good fit between the pipe and the tube plate, it is common to form one, two, or more circumferential grooves on the inside of the corresponding hole. The wall of the pipe is then expanded upon installation such that part of the pipe's wall is deformed into these grooves, thereby providing a mechanical interlock.

In order to form these grooves, it is common to employ what is referred to in the art as "grooving tools." These grooving tools are power tools that have a tool bit that is forced radially outward while the bit is spinning about a longitudinal axis to carve the grooves. One example of such a grooving tool is the GS series grooving tools available from Cooper Tools in Springfield, Ohio. As is understood by those of skill in the art, the action of the tool bit against the inside wall of the hole in the tube plate generates both heat and waste material. As such, it is desirable to cool the groove formation area and to provide some means of routing the waste material away. While forced air may be used as a coolant for such cooling and/or waste removal, it is more common to use various liquid machining coolants known in the art, such as water soluble cutting fluids. While various methods have been proposed and/or employed for supplying coolant in grooving tools, there remains a need for alternative approaches.

SUMMARY OF THE INVENTION

The present invention, in one embodiment, provides a grooving tool comprising: a spindle rotatable about a longitudinal axis thereof and having at least one coolant inlet port, a ramp portion, and a fluid flow path from the inlet port to the ramp portion; a tool bit moveably coupled to the ramped portion, the tool bit comprising one or more teeth and one or more coolant channels to supply coolant proximate the one or more teeth, the one or more coolant channels operatively connected to the fluid flow path; wherein movement of the tool bit along the ramp portion toward the inlet port causes the one or more teeth to be displaced outward from the longitudinal axis. The ramp portion may include a channel disposed proximate the tool bit, the channel operatively connecting the fluid flow path with the one or more coolant channels. The one or more teeth may comprise at least two teeth, and the one or more coolant channels may be in one-to-one correspondence to the teeth. The spindle may include a shank portion having a longitudinal recess that at least partially defines the ramp portion. The fluid flow path may include a longitudinal passage in the spindle which may be disposed generally along the longitudinal axis. A locating mechanism may be moveably coupled to the spindle, such as disposed between the inlet port and the teeth, with the tool bit coupled to the locating mechanism, optionally releasably. The coolant channels may be angled with respect to the teeth and dispense coolant supplied via the fluid flow path toward the teeth. The tool bit may have a tapered lower surface engaging the ramped portion and may be unitary.

In another embodiment, the grooving tool comprises a spindle rotatable about a longitudinal axis thereof and having a drive portion and a ramp portion, the ramp portion disposed generally parallel to the longitudinal axis and tapering away from the drive portion; a replaceable tool bit including one or more teeth and one or more coolant channels, the tool bit movably coupled to the ramp portion for movement therealong; wherein movement of the tool bit along the ramp portion toward the drive portion causes the one or more teeth to be displaced outward away from the longitudinal axis. The one or more coolant channels are advantageously disposed to direct coolant flowing therethrough toward the one or more teeth. The spindle may include a coolant path, at least a portion of the coolant path disposed generally parallel to the longitudinal axis, and optionally disposed generally along the longitudinal axis. The ramp portion may includes a channel disposed proximate the tool bit, the channel operatively connecting the coolant path with the one or more coolant channels.

In another embodiment, a method of forming a grooving tool comprises providing a spindle having a drive portion, a ramp portion, and a longitudinal axis, the ramp portion disposed generally parallel to the longitudinal axis and tapering away from the drive portion; providing a tool bit including one or more teeth and one or more coolant channels; coupling the tool bit to the spindle so that movement of the tool bit along the ramp portion toward the drive portion causes the one or more teeth to be displaced outward away from the longitudinal axis. The method may further comprise directing coolant generally toward the one or more teeth via the coolant channels of the tool bit. The providing a tool bit including one or more teeth and one or more coolant channels may comprise providing a tool bit including at least two teeth. The providing a spindle may comprise providing a spindle having a coolant path. The coupling the tool bit to the spindle may comprise operatively connecting the coolant path of the spindle to the one or more coolant channels of the tool bit for fluid flow therebetween. The providing a spindle having a coolant path may comprise providing a spindle having a longitudinal passage.

In still another embodiment, a method of operating a grooving tool comprises: providing a spindle having a drive portion, a ramp portion, and a longitudinal axis, the ramp portion disposed generally parallel to the longitudinal axis and tapering away from the drive portion; providing a tool bit including one or more teeth and one or more coolant channels; coupling the tool bit to the spindle so that movement of the tool bit along the ramp portion toward the drive portion causes the one or more teeth to be displaced outward away from the longitudinal axis; and rotating the spindle about the longitudinal axis and directing coolant generally toward the one or more teeth via the coolant channels of the tool bit during the rotating. The providing a spindle may comprise providing a spindle having a coolant path and the method may further comprise supplying the coolant to the coolant channels via the coolant path of the spindle.

DETAILED DESCRIPTION OF THE INVENTION

Figure 1:
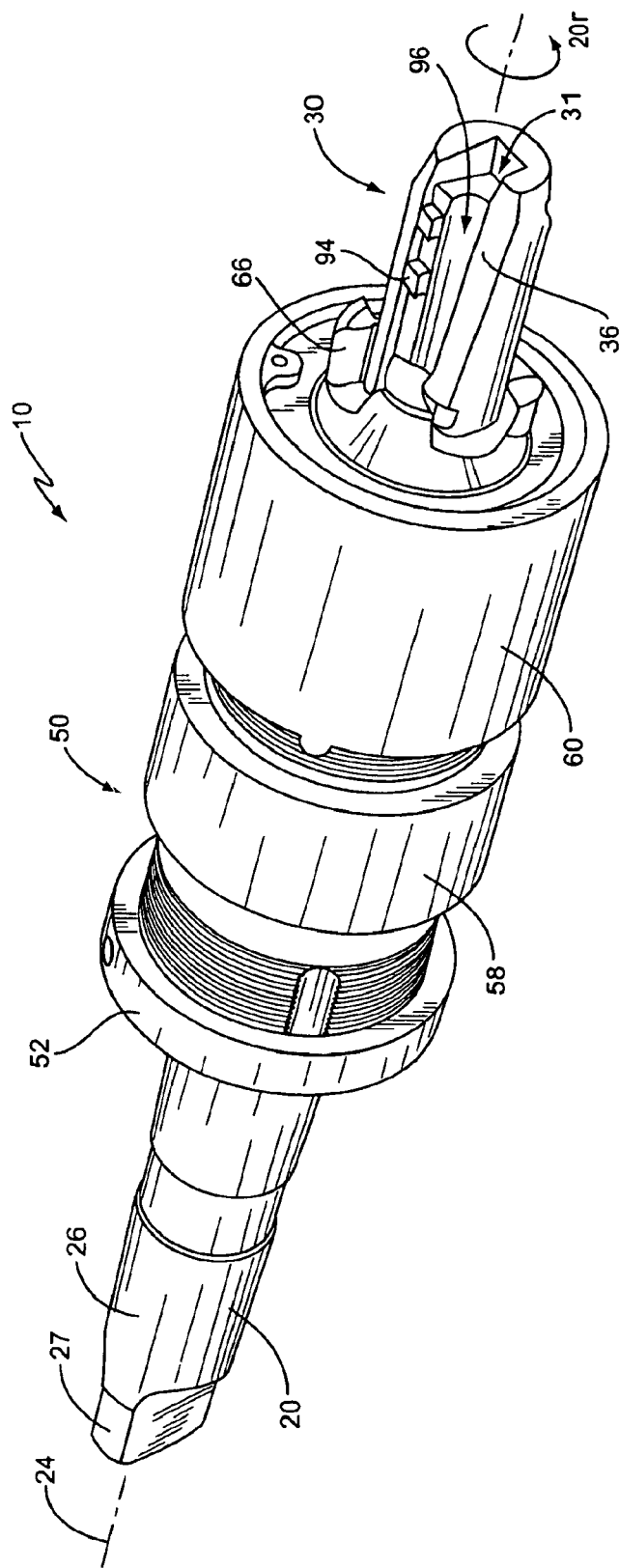
FIG. 1 shows a perspective view of one embodiment of grooving tool according to the present invention.
Figure 2:
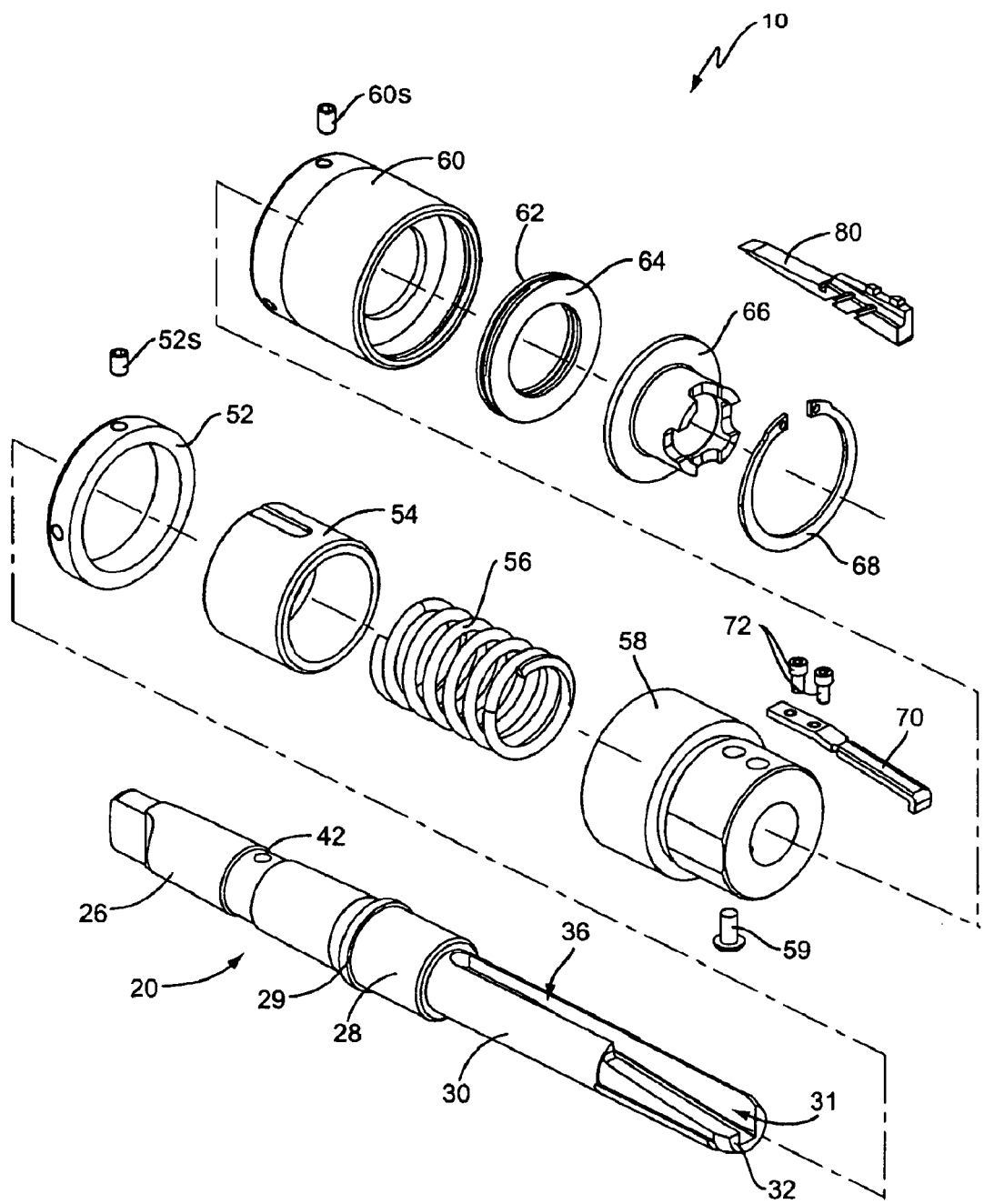
FIG. 2 shows an exploded view of the grooving tool of FIG. 1.

One embodiment of a grooving tool of the present invention is shown in FIGS. 1–2 and generally designated 10. This embodiment of the grooving tool 10 includes a spindle 20, a locating and adjusting mechanism 50, and a removable tool bit 80.

Figure 3A:
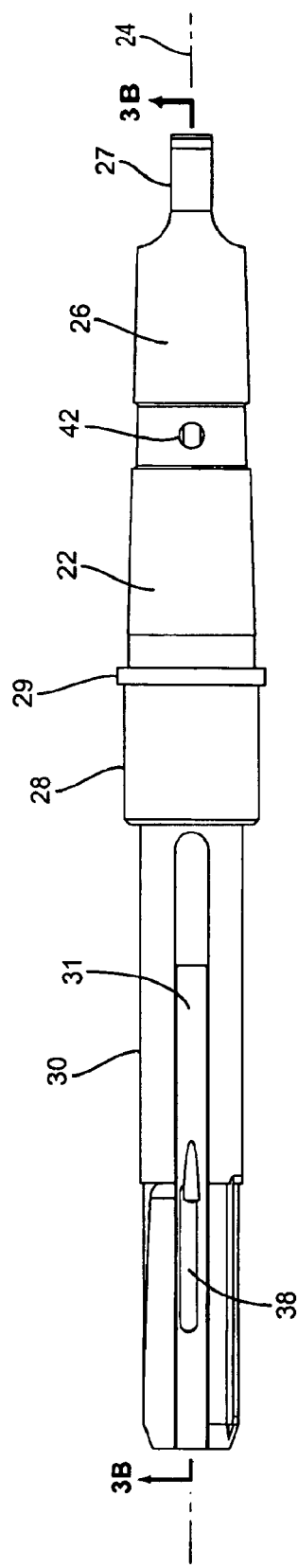
FIG. 3A shows a side view the spindle of FIG. 2.
Figure 3B:
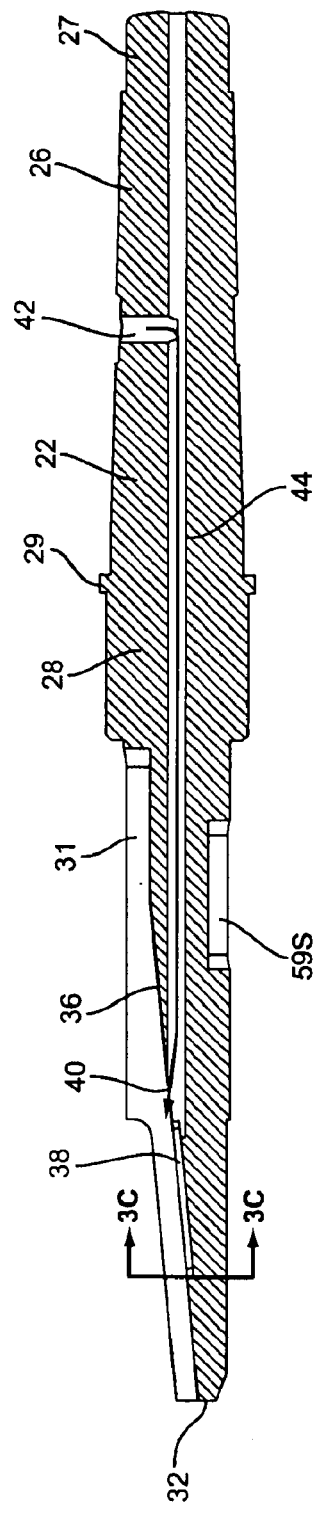
FIG. 3B shows a side cross-sectional view the spindle of FIG. 3A along the longitudinal axis.
Figure 3C:
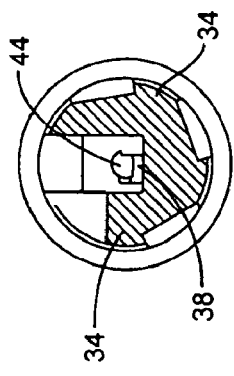
FIG. 3C shows a sectional end view of spindle of FIG. 3A along line A—A.

The spindle 20, shown in more detail in FIGS. 3A–C, includes an elongate body 22 extending along a longitudinal axis 24, with a drive end 26, a intermediate portion 28, and a working shank 30. The drive end 26 is adapted to receive rotational power from a suitable power tool, and therefore typically includes a square or otherwise faceted head 27. Also included on the drive end 26 of the spindle 20 is an area of reduced cross section having a generally radially extending coolant inlet port 42. The intermediate portion 28 of the spindle 20 includes a circumferential shoulder 29, but is otherwise generally cylindrical. The shank portion 30 extends forwardly from the intermediate portion 28 and includes a longitudinal recess 31 forming a ramped area 36 that starts out slightly recessed and becomes more recessed toward the tip 32 of the shank 30. The rate of ramping in the ramp area 36 should correspond to that of angle $\alpha$ on tool bit 80, discussed further below. The ramped area 36 is advantageously open-ended at the tip 32 and includes a higher wall on the rotationally following side with respect to the rotational direction 20$r$ of the spindle 20. Further, the shank portion 30 may include various spacing projections 34 that effectively form a segmented circumference for proper and consistent spacing and/or engagement with the surface of the pipe port (formed by the hole in the tube plate) being grooved. Optionally, inserts, typically formed from carbide or other suitable material, may be provided on the spindle 20 between the projections 34 for deburring surface being grooved and to improve the life of the spindle 20.

A coolant path 40 extends from at least the inlet port 42 to the ramped area 36. The coolant path 40 advantageously includes longitudinal passage 44 extending along the spindle 20 from the inlet port 42 to the ramped area 36, advantageously generally parallel to the longitudinal axis 24 of the spindle 20, and optionally coaxial therewith. The longitudinal passage 44 may extend further towards the head 27 of the drive end 26, but should be plugged or otherwise closed off so that any fluid entering the passage 44 will flow towards the ramped area 36 rather than toward head 27. The longitudinal passage 44 exits into a channel 38 formed in the ramped surface of the ramped area 36. The combination of the inlet port 42, the longitudinal passage 44, and the channel 38 allow coolant to be supplied to the spindle engaging side of the tool bit 80, as described further below.

The locating and adjusting mechanism 50 is positioned generally about the intermediate portion of the spindle 20 and the proximate portions of the shank portion 30. The locating and adjusting mechanism 50 is longitudinally moveable (e.g., slidable) with respect to the spindle 20 so that the spindle 20 may assume a retracted or extended position relative thereto. The locating and adjusting mechanism 50 functions to bias the spindle 20 to the retracted position and limit the amount of relative movement allowed between the spindle 20 and the locating and adjusting mechanism 50. In addition, the locating and adjusting mechanism 50 helps retain the tool bit 80. With particular reference to FIG. 2, the locating and adjusting mechanism 50 may include a stop nut 52 positioned toward drive end 26 of the spindle 20, followed by a stop sleeve 54, a spring 56 disposed generally internal to the stop sleeve 54 and a stop body 58, followed by an adjusting collar 60, a bearing 62 and race 64, a thrust bushing 66 and retaining ring 68. The stop nut 52 may be secured against stop sleeve 54 by screw 52$s$ and the adjusting collar 60 may likewise be secured against stop body 58 by screw 60$s$. The spring 56 acts to bias the spindle 20 to the retracted position by pushing against the stop nut 52 which in turn pushes against the spindle's shoulder 29.

The other end of the spring 56 pushes against the stop body 58, which is allowed limited movement with respect to spindle 20 via screw 59 which slides in a short longitudinal recess 59$s$ (see FIG. 3B) in the spindle 20 on the opposite side from the ramped area 36. The relative position of the adjusting collar 60 with respect to the spindle 20 may be adjusted to help set the axial location of the grooves formed by the grooving tool 10. The forward portion of the thrust bushing 66 is designed to abut against an outer surface of the material being grooved and thereby aid in positioning the grooves. The spindle 20 and the majority of the locating and adjusting mechanism 50 are intended to rotate with respect to the material being grooved, but the thrust bushing 66 is allowed to remain rotationally stationary with respect thereto via the action of bearing 62 and race 64. In addition, the thrust bushing 66 mates to the adjusting collar 60 and is retained therewith by retaining ring 68. The locating and adjusting mechanism 50 also includes a bit retaining clip 70 mounted to the stop body 58 via screws 72 which hold the bit 80 in longitudinally stationary position with respect to the stop body 58 of the to locating and adjusting mechanism 50. The retaining clip 70 includes a bent tip that engages with notch 83 on the tool bit 80. The length of the retaining clip 70 is advantageously kept relatively short, so as to increase the retention forced thereof. In addition, it should be noted that the retaining clip 70 should be positioned so that it does not extend radially outward too far when the tool bit 80 is at its maximum designed outward position (see discussion below), in order to avoid scarring the material being grooved.

Figure 4A:
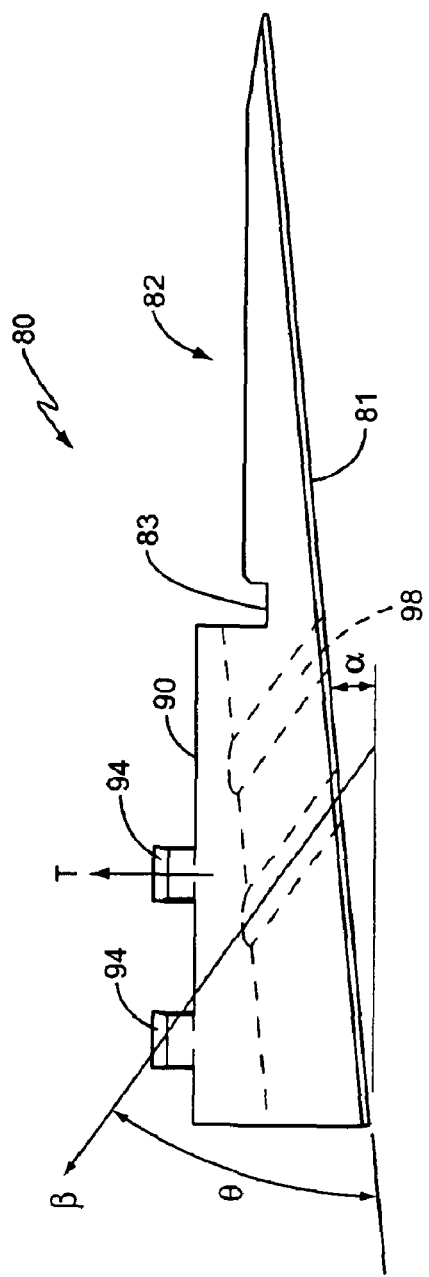
FIG. 4A shows a side view of the tool bit of FIG. 2.
Figure 4B:
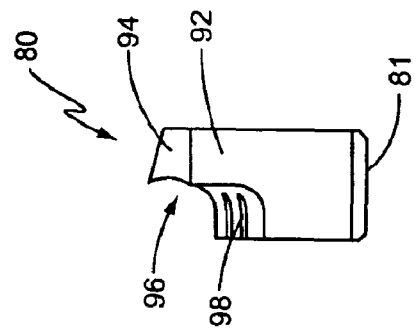
FIG. 4B shows a front view of the tool bit of FIG. 4A.

The tool bit 80, in general terms, advantageously has a generally triangular profile and a generally stepped rectangular cross section. See FIGS. 4A–B. The bit 80 includes mounting portion 82 and a working portion 90. The mounting portion 82 forms the thinner end of the bit 80 and is disposed, when assembled to the spindle 20, closer to the drive end 26 of the spindle 20. The mounting portion 82 includes the aforementioned notch 83 on its upper side for engaging with the retaining clip 70. The working portion 90 of the bit 80 includes at least one, and preferably two or more teeth 94 that extend upward from a flange portion 92 on the upper side of the bit 80 in direction T. Running laterally next to the flange portion 92 is a relatively recessed area 96 which is disposed rotationally forward of teeth 94 with respect to the rotational direction 20$r$ of the spindle 20. The underside of the mounting portion 82 and working portion 90 form a preferably smooth and planar lower surface 81. The plane of the lower surface 81 is angled with respect to the direction of the teeth 94 so that as the tool bit 80 moves along the ramped portion 36 of the spindle 20, the teeth 94 are moved radially in and out with respect to the longitudinal axis 24 of the spindle 20. In particular, as the tool bit 80 moves in an "up" direction along the ramped portion 36 of the spindle 20 (i.e., toward the drive end 26), the interaction of the ramp portion 36 and the tool bit 80 causes the teeth 94 to be displaced radially outward from the longitudinal axis 24 of the spindle 20. This outward displacement causes the teeth 94 to move against and then bite more and more into the lateral surface of the tube plate defining the hole, thereby forming the desired grooves. While the movement of the teeth 94 has been described as being radially outward from longitudinal axis 24, this is intended to describe a displacement that is substantially radial, but is not meant to imply that the displacement path need be precisely radial with respect to the longitudinal axis 24. The tool bit 80 may be formed of high speed tool steel, carbide, or other suitable hard materials.

In addition, the bit 80 includes at least one coolant channel 98 that supplies coolant to the area proximate the teeth 94. Preferably, there is a one to one correlation between the number of coolant channels and the number of teeth 94; for simplicity, the present discussion will assume that two teeth 94 and two coolant channels 98 are used, but any number of each may be used. The coolant channels 98 extend from the bottom side 81 of bit 80 to surface of the recess 96. These coolant channels 98 may be cut into the side of the bit 80, or may be internal to the bit 80. While not required for all embodiments, the coolant channels 98 may advantageously be angled forward so that their exits are located closer to the teeth 94 than their entrances. For instance, when the bottom surface 81 of the bit 80 is angled up at angle α of about five degrees from perpendicular to the direction T that the teeth 94 extend, the coolant channels 98 may be angled forward at an angle θ of about fifty-five degrees from the bottom surface 81. Ideally, the centerline of a given coolant channel 98 is aligned such that coolant exiting that coolant channel 98 in direction β is directed at the midpoint of the corresponding tooth 94. Thus, the coolant leaving a coolant channel 98 is advantageously generally "aimed" at a respective tooth 94. Further, while uniform spacing and angling of the coolant channels 98 and teeth 94 is believed advantageous, such is not required in all embodiments. Just by way of example, different coolant channels 98 may angled differently in some embodiments, such as when the teeth 94 are spaced widely apart, so as to prevent the need for an overly long channel 38, etc.

The assembly of the grooving tool 10 is fairly straightforward as suggested by FIG. 2. The locating and adjusting mechanism 50 is first assembled and then longitudinally compressed by a suitable jig so that spring 56 is compressed. The locating and adjusting mechanism 50 is then fitted over the spindle 80 and screw 59 is inserted into longitudinal recess 59s in spindle 20. The jig is then removed, releasing spring 56. The tool bit 80 may be added before or after the jig is removed, depending on the details of the particular embodiment.

During use, the grooving tool 10 is supplied with coolant during the groove formation process. The coolant is supplied to inlet port 42, typically via a spindle adapter designed to mate with the spindle 20 in the area proximate the inlet port 42. From the inlet port 42, the coolant flows along coolant path 40 toward the tool bit 80. For most embodiments, when the coolant leaves the longitudinal passage 44, the coolant enters the channel 38 in ramped portion 36, and then flows in and through coolant channels 98 in the tool bit 80, and out toward the teeth 94. This flow of coolant helps cool the teeth 94 and the material being grooved. In addition, the flow of coolant helps wash away and cool any chips or other debris from the grooving process; this action helps prevent the debris from quasi-welding itself to the bit 80 or the material being grooved, thereby lessening the chances of scarring. The coolant and any debris then exits the area by flowing along the longitudinal recess 31 of spindle 20 and/or recessed area 96 of bit 90 and out the tip 32.

The inclusion of the coolant channels 98 in the tool bit 80 helps improve the supply of coolant. In particular, having the coolant channels 98 in the tool bit 80 allows the output of the coolant channels 98 to be located very close to the tip of the teeth 94. Further, the close proximity of the coolant channels 98 and teeth 94 allow the coolant to more easily be routed to clean away the debris material generated by the groove formation process. This benefits are believed best achieved when the coolant channels 98 in the tool bit 80 are angled away from the mounting portion 82 and aimed at the corresponding teeth 94.

The discussion above has assumed that the longitudinal passage 44 is a simple straight bore, as is believed advantageous, but this is not required. For example, the longitudinal passage 44 of the spindle 20 may be have any number of twists, turns, segments, radially extending sections, joined segments, or the like, as the function of the passage 44 is to provide at least a portion of the coolant flow path 40 from the inlet port 42 to the ramped area 36.

Further, the discussion above has assumed that the tool bit 80 is of a unitary construction; however, this is not strictly required for all embodiments. Indeed, the tool bit 80 may optionally comprise a multi-part arrangement, such as a carriage that moves along the ramped portion 36 and an insert having the teeth 94 and mounted to the carriage. For such an arrangement, the coolant channels 98 would be in the carriage. The multi-part tool bit 80 advantageously allows the insert having the teeth 94 to be formed from carbide if desired; however, an integral tool bit 80 may be more easily fabricated using powdered metal fabrication techniques.

Likewise, the discussion above has been in terms of an inlet port 42 that runs generally radially with respect to the longitudinal axis 24 of the spindle 20, and that is disposed some distance from the head 27. However, in some embodiments, the inlet port may be disposed in the head 27 and/or aligned with the longitudinal axis 24. Thus, the inlet port 42 may be in essence the entrance portion of the longitudinal passage 44 in some embodiments.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A grooving tool, comprising:
   a spindle rotatable about a longitudinal axis thereof and having at least one coolant inlet port, a ramp portion, and a fluid flow path from said inlet port to said ramp portion;
   a tool bit moveably coupled to said ramped portion, said tool bit comprising one or more teeth and one or more coolant channels to supply coolant proximate said one or more teeth, said one or more coolant channels operatively connected to said fluid flow path; and
   wherein movement of said tool bit along said ramp portion toward said inlet port causes said one or more teeth to be displaced outward from said longitudinal axis.

2. The grooving tool of claim 1 wherein said ramp portion includes a channel disposed proximate said tool bit, said channel operatively connecting said fluid flow path with said one or more coolant channels.

3. The grooving tool of claim 1 wherein said one or more teeth comprise at least two teeth.

4. The grooving tool of claim 3 wherein said one or more coolant channels are in one-to-one correspondence to said at least two teeth.

5. The grooving tool of claim 1 wherein said spindle includes a shank portion having a longitudinal recess that at least partially defines said ramp portion.

6. The grooving tool of claim 1 wherein said fluid flow path includes a longitudinal passage in said spindle.

7. The grooving tool of claim 6 wherein said longitudinal passage is disposed generally along said longitudinal axis.

8. The grooving tool of claim 1 further comprising a locating mechanism moveably coupled to said spindle, said tool bit coupled to said locating mechanism.

9. The grooving tool of claim 8 wherein said locating mechanism is disposed between said inlet port and said teeth.

10. The grooving tool of claim 1 wherein said one or more coolant channels are angled with respect to said one or more teeth and dispense coolant supplied via said fluid flow path toward said one or more teeth.

11. The grooving tool of claim 1:
wherein said one or more teeth comprise at least two teeth and wherein said one or more coolant channels are in one-tone correspondence to said at least two teeth;
wherein said ramp portion includes a channel disposed proximate said tool bit, said channel operatively connecting said fluid flow path with said one or more coolant channels;
wherein said spindle includes a shank portion having a longitudinal recess that at least partially defines said ramp portion;
wherein said fluid flow path includes a longitudinal passage in said spindle disposed generally along said longitudinal axis.

12. The grooving tool of claim 11 further comprising a locating mechanism moveably coupled to said spindle, said tool bit coupled to said locating mechanism.

13. The grooving tool of claim 11 wherein said coolant channels are angled with respect to said teeth and dispense coolant supplied via said fluid flow path toward said teeth.

14. The grooving tool of claim 11 wherein said tool bit has a tapered lower surface engaging said ramped portion.

15. The grooving tool of claim 11 wherein said tool bit is unitary.

16. A grooving tool, comprising:
a spindle rotatable about a longitudinal axis thereof and having a drive portion and a ramp portion, said ramp portion disposed generally parallel to said longitudinal axis and tapering away from said drive portion;
a replaceable tool bit including one or more teeth and one or more coolant channels, said tool bit movably coupled to said ramp portion for movement therealong; and
wherein movement of said tool bit along said ramp portion toward said drive portion causes said one or more teeth to be displaced outward away from said longitudinal axis.

17. The grooving tool of claim 16 wherein said one or more coolant channels are disposed to direct coolant flowing therethrough toward said one or more teeth.

18. The grooving tool of claim 16 wherein said spindle includes a coolant path, at least a portion of said coolant path disposed generally parallel to said longitudinal axis.

19. The grooving tool of claim 18 wherein said coolant path includes a longitudinal passage in said spindle disposed generally along said longitudinal axis.

20. The grooving tool of claim 18 wherein said ramp portion includes a channel disposed proximate said tool bit, said channel operatively connecting said coolant path with said one or more coolant channels.

21. The grooving tool of claim 16 wherein said one or more coolant channels are in one-to-one correspondence to said one or more teeth.

22. The grooving tool of claim 16 wherein said spindle includes a shank portion having a longitudinal recess that at least partially defines said ramp portion.

23. The grooving tool of claim 16 further comprising a locating mechanism moveably coupled to said spindle, said tool bit releasably coupled to said locating mechanism.

24. The grooving tool of claim 16 wherein said one or more coolant channels are angled with respect to said one or more teeth.

25. A method of forming a grooving tool, comprising:
providing a spindle having a drive portion, a ramp portion, and a longitudinal axis, said ramp portion disposed generally parallel to said longitudinal axis and tapering away from said drive portion;
providing a tool bit including one or more teeth and one or more coolant channels;
coupling said tool bit to said spindle so that movement of said tool bit along said ramp portion toward said drive portion causes said one or more teeth to be displaced outward away from said longitudinal axis.

26. The method of claim 25 further comprising directing coolant generally toward said one or more teeth via said coolant channels of said tool bit.

27. The method of claim 25 wherein providing a tool bit including one or more teeth and one or more coolant channels comprises providing a tool bit including at least two teeth.

28. The method of claim 25 wherein providing a spindle comprises providing a spindle having a coolant path.

29. The method of claim 28 wherein coupling said tool bit to said spindle comprises operatively connecting said coolant path of said spindle to said one or more coolant channels of said tool bit for fluid flow therebetween.

30. The method of claim 28 wherein providing a spindle having a coolant path comprises providing a spindle having a longitudinal passage.

31. A method of operating a grooving tool, comprising:
providing a spindle having a drive portion, a ramp portion, and a longitudinal axis, said ramp portion disposed generally parallel to said longitudinal axis and tapering away from said drive portion;
providing a tool bit including one or more teeth and one or more coolant channels;
coupling said tool bit to said spindle so that movement of said tool bit along said ramp portion toward said drive portion causes said one or more teeth to be displaced outward away from said longitudinal axis; and
rotating said spindle about said longitudinal axis and directing coolant generally toward said one or more teeth via said coolant channels of said tool bit during said rotating.

32. The method of claim 31 wherein said providing a tool bit including one or more teeth and one or more coolant channels comprises providing a tool bit including at least two teeth.

33. The method of claim 32 wherein said providing said tool bit comprises providing said tool bit with one or more coolant channels angled with respect to said teeth.

34. The method of claim 31 wherein providing a spindle comprises providing a spindle having a coolant path and further comprising supplying said coolant to said coolant channels via said coolant path of said spindle.

* * * * *